(12) United States Patent
Stocker et al.

(10) Patent No.: US 8,614,624 B2
(45) Date of Patent: Dec. 24, 2013

(54) METHOD OF TRANSFERRING ENERGY BETWEEN A FIRST UNIT AND A SECOND UNIT

(75) Inventors: Klaus Stocker, Stuttgart/Möhringen (DE); Dieter Kopp, Illingen (DE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/604,099

(22) Filed: Sep. 5, 2012

(65) Prior Publication Data
US 2012/0326838 A1 Dec. 27, 2012

Related U.S. Application Data

(63) Continuation of application No. 12/396,687, filed on Mar. 3, 2009, now Pat. No. 8,279,041.

(30) Foreign Application Priority Data

Mar. 4, 2008 (EP) ..................................... 0829012

(51) Int. Cl.
*G05B 19/00* (2006.01)
(52) U.S. Cl.
USPC ............ 340/5.8; 702/61; 903/902; 340/870.2
(58) Field of Classification Search
None
See application file for complete search history.

(56) References Cited

U.S. PATENT DOCUMENTS

| | | | | |
|---|---|---|---|---|
| 4,777,354 A | * | 10/1988 | Thomas | 235/380 |
| 5,306,999 A | * | 4/1994 | Hoffman | 320/109 |
| 5,461,298 A | * | 10/1995 | Lara et al. | 320/109 |
| 5,462,439 A | | 10/1995 | Keith | |
| 5,594,318 A | | 1/1997 | Nor et al. | |
| 5,617,003 A | | 4/1997 | Odachi et al. | |
| 5,646,500 A | | 7/1997 | Wilson | |
| 5,758,414 A | | 6/1998 | Ehrenfels | |
| 5,847,537 A | * | 12/1998 | Parmley, Sr. | 320/109 |
| 6,459,234 B2 | | 10/2002 | Kajiura | |

(Continued)

FOREIGN PATENT DOCUMENTS

| | | |
|---|---|---|
| DE | 103 04 284 | 8/2004 |
| GB | 2 313 462 | 11/1997 |
| GB | 2 438 979 | 12/2007 |
| WO | WO 2009/090813 | 7/2009 |

OTHER PUBLICATIONS

"La Voiture Urbaine Electrique Par Abonnement", Opeugeot Lance Le Systeme Tulip, Revue Automobile, Buechler Grafino AG, CH, vol. 90, No. 16, XP000497754, pp. 23-24, Apr. 13, 2005.

(Continued)

*Primary Examiner* — Rexford Barnie
*Assistant Examiner* — Angela Brooks
(74) *Attorney, Agent, or Firm* — Fay Sharpe LLP

(57) ABSTRACT

A method for transferring energy between first and second units with first and second meters and subscriptions to first and second backend platforms, as well as a first unit for supporting such energy transfer, where the backend platforms execute an authentication procedure and a switch is unbarred by the first control box upon successful execution of the authentication procedure. A second control box sends an amount of the transferred energy measured by the second meter to the first control box energy consumption data is sent to the backend platforms, and a consumption clearing procedure is executed between the first and the second units at the backend platforms by means of the received energy consumption data.

12 Claims, 6 Drawing Sheets

(56) References Cited

U.S. PATENT DOCUMENTS

| | | |
|---|---|---|
| 6,476,728 B1 | 11/2002 | Sakakibara |
| 7,999,506 B1 | 8/2011 | Hollar et al. |
| 8,000,858 B2 * | 8/2011 | Tonegawa et al. ............. 701/36 |
| 2006/0042846 A1 | 3/2006 | Kojori et al. |
| 2007/0168104 A1 * | 7/2007 | Nelson et al. ................ 701/93 |
| 2009/0224939 A1 * | 9/2009 | Stocker et al. .......... 340/870.02 |
| 2010/0194529 A1 * | 8/2010 | Yamamoto .................. 340/5.65 |
| 2011/0022222 A1 | 1/2011 | Tonegawa |
| 2011/0140658 A1 | 6/2011 | Outwater et al. |
| 2011/0200193 A1 * | 8/2011 | Blitz et al. .................... 380/277 |
| 2011/0227531 A1 * | 9/2011 | Rajakaruna .................. 320/109 |

OTHER PUBLICATIONS

European Search Report, Application No. 08290212.3, Jul. 7, 2008.

\* cited by examiner

METHOD OF TRANSFERRING ENERGY BETWEEN A FIRST UNIT AND A SECOND UNIT

REFERENCE TO RELATED APPLICATION

This application is a continuation of and claims priority to and the benefit of U.S. patent application Ser. No. 12/396,687, filed on Mar. 3, 2009 now U.S. Pat. No. 8,279,041, entitled METHOD OF TRANSFERRING ENERGY BETWEEN A FIRST UNIT AND A SECOND UNIT, which claims priority to EP 08290212.3 filed Mar. 4, 2008, the entirety of which application is hereby incorporated by reference.

BACKGROUND

The invention is based on a priority application EP08290212.3 which is hereby incorporated by reference.

The present invention relates to a method of transferring energy between a first unit and a second unit and to a first unit supporting this energy transfer, wherein at least one of the units is mobile.

Nowadays, more and more mobile units, like cars or vehicles with an electrical engine or other arbitrary mobile electrical devices are available. For a user, which is a subscriber to an energy provider, it might be desirable and convenient to allow charging batteries, to share or to transfer energy, in particular electricity, at arbitrary main power sockets on own tariff and invoice.

For instance, the German patent application DE 103 04 284 A1 describes an identification arrangement for use between a motor vehicle and a charging station for energy or fuel, whereby the vehicle and the charging station exchange data. The vehicle has an identification unit that transmits identifying data to the loading station, so that charging only begins once the vehicle is successfully identified and authenticated.

SUMMARY

The object of the present invention is to support the transfer of energy between a first and a second unit, wherein at least one of the units is mobile.

The object of the present invention is achieved by a method of transferring energy between a first unit and a second unit, wherein at least one of the units is mobile, wherein the first unit has a subscription at a first backend platform and comprises a first meter for measuring energy exchanged with an external power source and/or an external power consumer, a first control box, a switch which allows to interrupt the transfer of energy to the external power consumer and communication means for communicating with the first backend platform, wherein the second unit has a subscription at a second backend platform and comprises a second meter for measuring energy received from an external power source, a second control box and communication means for communicating with the second backend platform, and wherein a power line connects the first unit to the second unit, the second control box sends, preferably via the power line, a request for transferring energy to the first control box, an authentication procedure is executed between the first and the second unit by means of the first and second backend platform, the first control box unbars the switch upon successful execution of the authentication procedure, the second control box sends an amount of the transferred energy measured by the second meter to the first control box, energy consumption data comprising data about the amount of transferred energy measured by the second meter and energy transfer data comprising data about an amount of exchanged energy measured by the first meter is sent to the second and first backend platform, respectively, and a consumption clearing procedure between the first and the second unit is executed by means of the received energy consumption data at the first and second backend platform. The object of the present invention is also achieved by a first unit for supporting the transfer of energy between the first unit and a second unit, wherein at least one of the units is mobile and the first unit has a subscription at a first backend platform and the second unit has a subscription at a second backend platform, wherein the first unit comprises a first meter for measuring energy exchanged with an external power source and/or an external power consumer, a first control box, a switch which allows to interrupt the transfer of energy to the external power consumer and communication means for communicating with the first backend platform, and wherein the first control box is adapted to receive, preferably via a power line connecting the first and second unit, a request for transferring energy sent by a second control box of the second unit, support the execution of an authentication procedure between the first and the second unit by means of the first and second backend platform, unbar the switch upon successful execution of the authentication procedure, receive the amount of the transferred energy measured by a second meter of the second unit from the second control box, and send energy consumption data comprising data about an amount of exchanged energy measured by the first meter to the first backend platform for execution of a consumption clearing procedure between the first and the second unit.

The present invention provides a solution for, preferably mobile, electrical devices, which allow to consume energy or charge them at arbitrary power socket. It solves problems appearing with the handling of tariffs, related taxes, control of consumption, fraud and misuse. Tariffs, taxes and the actual consumption in kilowatt-hours can be handled completely independent from each other and even by different energy providers by means of the consumption clearing procedure between the first and second backend platform. Furthermore, the invention allows the control and tariffing of energy transfers or flows, which are not making their way through a "conventional" wire. It allows also controlling, tariffing and billing of energy flow that go through a first mobile unit to other mobile devices, i.e. a second mobile unit, e.g. an electrical car, or back to a house or fixed installations, i.e. a non-mobile second unit. The present invention allows roaming of energy, in particular of electricity. Furthermore, the present invention provides a user-friendly and customer-friendly consumption clearing procedure. It becomes possible to differentiate tariffs, for instance, according to different taxes and depending on energy usage. The tariffs used for the cascaded meters, i.e. the first and the second meter, can be completely different. The method allows, as said above, even the backfeeding of energy, e.g. from a mobile unit, e.g. an electrical car, to non-mobile units, e.g. a house while controlling this by a certain tariff and calculating correct tax payment according to the usage, e.g. home or vehicle.

Further advantages are achieved by the embodiments of the invention indicated by the dependent claims.

According to a preferred embodiment of the invention the first and second control box communicate via the power line which connects the first and the second unit by means of a power line communication (power line communication=PLC) protocol. The communication means handling this communication are connected in such a way with the power line that the switch or switches which interrupt the transfer of energy, e.g. like electricity, will not interrupt the communication of the first and second control box via the power line. This approach improves the liability of the authentication and identification process since the communication is not executed over an "open" communication network but via a physical point to point connection which connects the first and second unit only. But, it is also possible that the first and second control box communicate via a short range wireless communication protocol, e.g. a blue tooth protocol or wireless local area network protocol.

The first and the second backend platforms are preferably separated platforms wherein the first backend platform is the platform of a first energy provider the first unit is subscripted to and the second platform is the platform of a second energy provider the second unit is subscripted to. But, it is also possible that the first and the second backend platform are identical and one and the same platform, for instance, if the first and the second unit has the same energy provider.

According to a preferred embodiment of the invention the second control box sends, preferably via the power line, an authentication request about the second unit to the first control box. The first control box sends a corresponding authentication request about the second unit to the first backend platform. The first backend platform sends a corresponding authentication request about the second unit to the second backend platform. The second backend platform authenticates the second unit to the first control box and the first backend platform by means of sending authentication data back to the first backend platform which sends corresponding authentication data to the first control box.

Preferably, the authentication request comprising a preferably encrypted, identification of the second unit. The first backend platform sends an authentication request comprising this, preferably encrypted, identification of the second unit to the second backend platform. The second backend platform verifies said authentication request by means of the identification of the second unit.

Furthermore, it is also possible that that the first and the second backend platform are the same platform, e.g. if both units, the first and the second unit, has a subscription to one and the same energy provider. In this case, the first and the second unit are represented by different corresponding subscriptions at one backend platform. The backend platform accesses the subscription data of the second unit to validate the authentication request received from the first control box. If the validation is successful it authenticates the second unit to the first control box by sending corresponding authentication data back to the first control box.

Preferably, the second backend platform sends tariff data to the second control box which informs the second control box about available tariffs for power consumption. The second control box or the user of the second unit selects one of the available tariffs. Then, the second control box sends a message back to the second backend platform which indicates the selected tariff towards the second backend platform, i.e. the energy provider of the second unit.

According to a preferred embodiment of the invention the second backend platform sends tariff data and control data to the second control box. The second control box bars and/or unbars a switch of the second unit for controlling the transfer of energy according to the received tariff data and control data. This ensures that the second unit complies with the conditions of the selected tariff.

According to a preferred embodiment of the invention the first control box and/or the second control box stores data values of the transfer of energy, preferably comprising an amount of transferred energy, one or more timestamps, authentication data (e.g. an authentication certificate) and/or an identification of the first unit and/or second unit. Such further steps improve the protection of both, the first and second unit, against fraud and misuse.

Furthermore, the first control box preferably stores during the transfer of energy, preferably in short time intervals, interim data values of the transfer of energy, e.g. comprising an amount of transferred energy, one or more timestamps, authentication data and/or an identification of the first and/or second unit. To gather this information, it is preferred that the second control box frequently sends, during the transfer of energy, interim data values of the transfer of energy, e.g. comprising an amount of transferred energy, one or more timestamps, and/or an identification of the second unit, to the first control box. The first control box stores said received interim data values. These further steps provide additional protection against fraud and misuse.

According to a preferred embodiment of the invention the first meter and the second meter regularly determine energy consumption data comprising, for example, an amount of energy consumption, one or more timestamps and an identification of the first unit and second unit, respectively. Said energy consumption data is forwarded to the first and second backend platforms as further input for the consumption clearing procedure.

According to a preferred embodiment of the invention the first and second backend platform determines by means of the consumption clearing process energy flow data, and forwards the determined energy flow data to a further application, preferably a tax calculation application, for further processing. The energy flow data indicate the flow of energy to a unit, preferably a mobile unit, and respect the amount of energy received by this unit from other units and the amount of energy transferred from this unit to other units.

Preferably, the first control box and/or the second control box unbar and/or bar the switch of the first unit and/or a switch of the second unit, respectively upon receipt of a corresponding instruction from the first and/or second backend platform, respectively. But it is also possible that the first control box and the second control box bar the switch of the first unit and a switch of the second unit, respectively, upon receipt of a corresponding manual input of a first and second user assigned to the first and second unit, respectively.

These as well as further features and advantages of the invention will be better appreciated by reading the following detailed description of presently preferred exemplary embodiments taken in conjunction with accompanying drawings of which:

Figure 1:
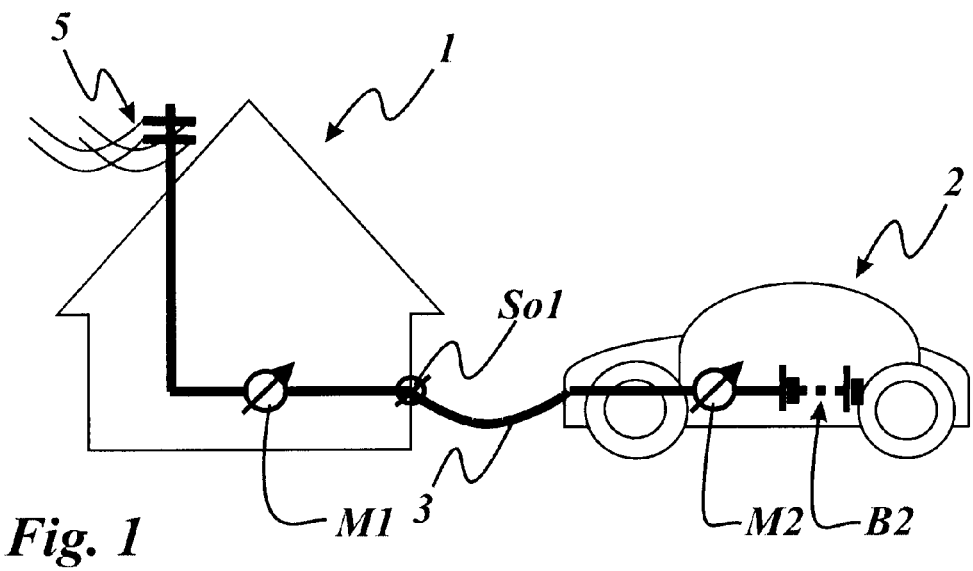
FIG. 1 shows a diagram which illustrates the "Principle of Cascaded Electrical Energy Consumption", here charging of a vehicle, i.e. a second mobile unit.
Figure 2:
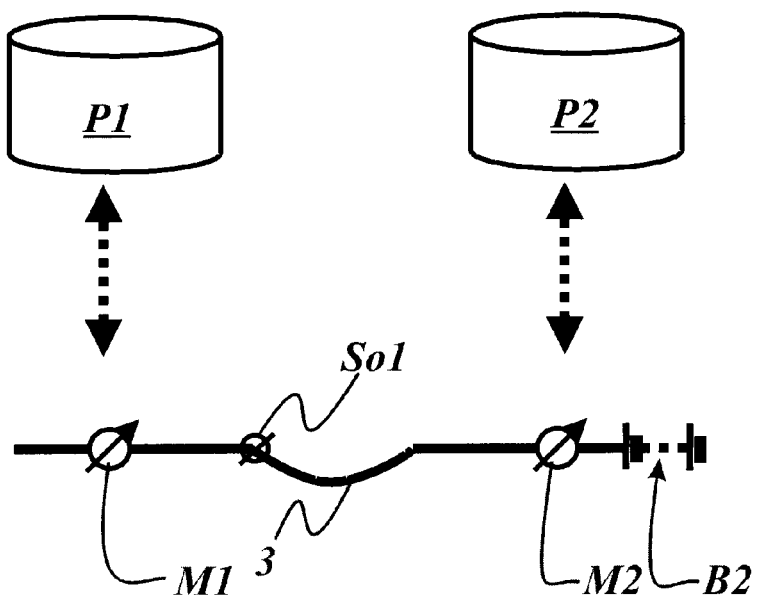
FIG. 2 shows a diagram which illustrates the communication flows between the electronic meters and the backend platforms of the electricity providers.

FIG. 1 illustrates the basic principles of cascaded electronic meters, the meters M1 and M2, whereby the corresponding communication is sketched by means of FIG. 2. The present example is directed to the charging of a battery B2 of a vehicle, i.e. a second unit 2. In particular, the exchange of communication in all figures is indicated by thick dashed arrows.

FIG. 1 shows a first unit 1, which is a house, connected to an external power energy provider 5, i.e. to its utilities. The unit 1 comprises a meter M1 and an arbitrary socket So1. Furthermore, the second unit 2, which is mobile, for instance, a vehicle or car, comprises a second meter M2 and the battery B2. The first unit 1 and the second unit 2 are connected via a power line 3. The power line 3 serves also for short-range communication transmission, e.g. a power line communication. In the present example "The Vehicle", i.e. the second unit 2, is plugged to the socket So1 of the first unit 1, which can be e.g. a private household or a public parking area etc. In the following we use the term "The Vehicle" equivalently for the mobile unit 2.

The household or parking area, i.e. the first unit 1, is equipped with a smart meter, i.e. the first meter M1, which has the ability to communicate directly or indirectly via a control box with the electricity providers backend platform P1 which processes the consumption data according to the households tariffs and creates corresponding billing to the customer. The first meter M1 is used for measuring energy exchanged with the power grid of the energy provider 5, i.e. with external power sources and/or an external power consumer connected with this grid. The first unit 1 has a subscription at a first backend platform P1 which is the backend platform of the energy provider 5. Furthermore, control information about availability of certain tariffs is given by means of the backend platform P1, e.g. cheap tariffs during night time or as long as solar or wind energy is available.

The meter M2 is connected in such a way with the battery B2 of the second unit 2 that this battery can be charged through the meter M2 only. The meter M2 is an electronic smart meter, as described above. The second meter M2 measures the energy received from an external power source, e.g. via the socket So1. The unit 2 and the meter M2 communicate with this backend platform as described above. The unit 2 has a subscription at another electricity provider's backend platform P2 and different special tariffs especially for the mobile consumption.

Preferably, the first and the second backend platform P1, P2 communicate with the first and the second meter M1, M2, respectively via a public switched telephone network, e.g. a GPRS service of a GSM network or a UMTS network and/or a public land mobile network.

The utility assigned to the second backend platform P2 could be a virtual or a real electricity producing utility, which is specialized on mobile tariffs. This kind of tariffs could even include taxes for vehicle energy consumption similar to today's petroleum tax.

The given arrangement, as shown in FIGS. 1 and 2, guarantees that the consumption information is securely transferred to the backend platforms P1 and P2 of the corresponding utilities through a Public Key Infrastructure.

However, fraud is still possible, if there is no careful observation of the complete process. Furthermore, the meter IDs (ID=identification) need to be exchanged manually, which is a potential source of fraud and/or accidental misuse.

Figure 3:
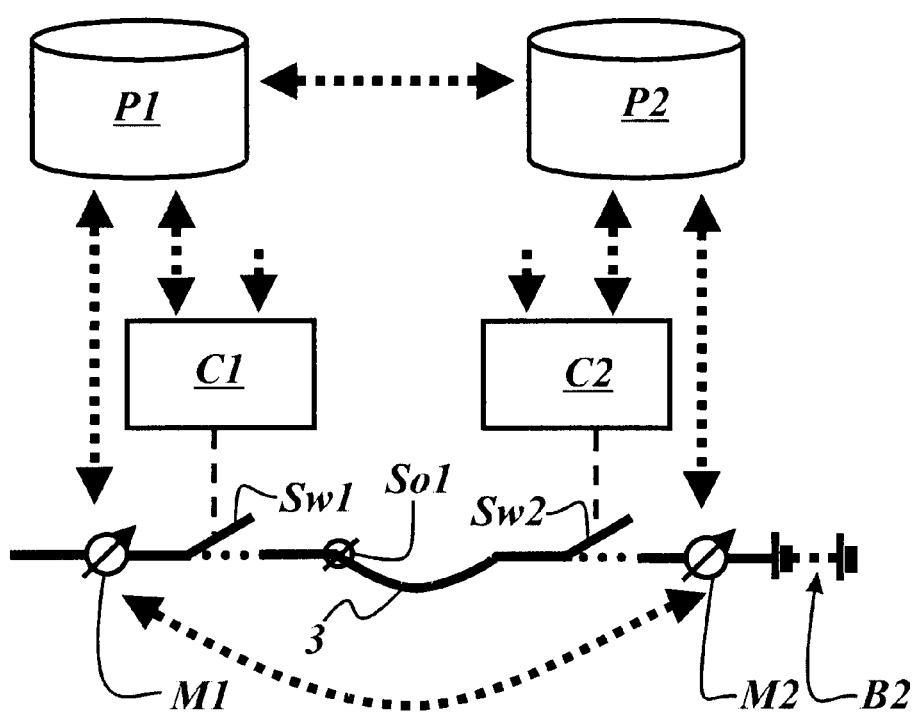
FIG. 3 shows a diagram which illustrates in detail method for transferring energy between a first and a second unit.

By means of FIG. 3 the method for transferring energy between a first unit 1 and a second unit 2 is described in more detail and further necessary measures are addressed.

In FIG. 3 further entities which have not yet been introduced by FIG. 2 are comprised as follows: The first unit 1 and the second unit 2 comprise a first switch Sw1 and second switch Sw2, respectively, which allow the interruption of the transfer of energy between the first unit 1 and the second unit 2, respectively. However both switches Sw1 and Sw2 do not interrupt communication passing through these switches, i.e. the switches Sw1 and Sw2 are able to break the energy flow, i.e. the transfer of energy, while being open for power line communication via the power line 3 so that all necessary communication on authentication, tariffs and control etc. can be carried out before the actual energy flow starts. The preconditional power line communication is allowed through the application of a high pass filter bridging the electrical power switch. The switches Sw1 and Sw2 can be realized by conventional electrical power switches.

The first unit 1 and the second unit 2 comprise a first control box C1 and a second control box C2, respectively. The first control box C1 and the second control box C2 comprise communication means which allow to communicate via the public land mobile network and/or the public telephone switched network used for communication with the platforms P1 and P2. Furthermore the first control box C1 and the second control box C2 control the first switch Sw1 and the second switch Sw2, respectively.

For instance, the first control box C1 receives control information from the first backend platform P1 in case that e.g. cheap night tariffs shall be used. The first control box C1 controls the first switch Sw1 accordingly. This is analogously possible for the second control box C2 and the second switch Sw2. However, it is also possible that the second control box C2 is controlled e.g. by a bord controller of the second unit 2, and/or manually and/or by the second backend platform P2, e.g. for Pre-paid tariffs or in case that the contract with utilities assigned to the second unit 2 is cancelled or expired.

In the case of manual interaction with the first and second control boxes C1, C2, the control information supplied, e.g. together with cheap tariffs, can be ignored.

Preferably, for a secure communication, a Public Key Infrastructure is used. Metering information is secured by the Public Keys of the first and second backend platforms P1, P2 used for encryption, authenticity of information and authentication of consumers or subscribers. Control information sent to the meters M1, M2 and control boxes C1, C2 are secured by the public keys of the units 1 and 2 or the public keys of the meters M1, M2 and control boxes C1, C2, correspondingly.

In order to allow an offline clearing of consumption of energy and verification at a later stage, the second meter M2 is sending its measured amount of energy consumption on two ways:

First, permanently, preferably in short time intervals, to the first control box C1 using authenticity certificate or credentials provided by the second backend platform P2 during an authentication procedure, and second on request to the second backend platform P2. This allows a verification of the amount of transferred energy and transferred energy and/or consumption data on both parties sides.

Alternatively, the communication between "The Vehicle", i.e. the second unit 2, and the first backend platform P1 and control box C1, could be set up through a public land mobile network.

The first control box C1 forwards the amount of transferred energy, i.e. the consumption, together with total own consumption measured by the first meter M1 as an additional information on request to the first backend platform P1.

Preferably, before the first and second backend platforms P1, P2 perform a consumption clearing procedure, the authenticity of "The Vehicle" consumption, i.e. the amount of transferred energy to the second unit 2, can be checked and verified.

The units 1 and 2 and the platforms P1 and P2 execute, for example, the following procedure for transferring energy from the first unit 1 to the second unit 2:

The first unit 1 is connected to the second unit 2 by means of a power line 3, wherein a plug of the power line 3 is inserted into a socket So1 of the first unit. The second control box C2 sends a charge request to the first control box C1 via the power line 3, i.e. the second control box C2 sends, preferably via the power line 3, a request for transferring energy to the first control box C1.

Further, an authentication procedure between the first and the second unit 1, 2 is executed by means of the first and second platform P1, P2 as follows: The second control box C2 sends an authentication request of the second unit 2, in the present case "The Vehicle", preferably via the power line 3, to the first control box C1. The first control box C1 sends the received authentication request of the second unit 2 to the first backend platform P1 assigned to the first unit 1. The first backend platform P1 sends the authentication request to the second backend platform P2. It is possible that the authentication request further comprises the amount and tariff preference of the requested transfer of energy. The second backend platform authenticates the authentication request of the first backend platform P1 by providing corresponding credentials. The first backend platform P1 forwards the credentials to the first control box C1. The first control box C1 unbars the first switch Sw1, preferably according to the received credentials. Preferably, during the authentication procedure Public Key encrypted identifications between the first and second control boxes C1, C2 are exchanged to clearly identify the transfer of energy involved customers or users. Upon successful execution of the authentication procedure, the first control box C1 unbars the first switch Sw1.

It is possible that the second backend platform sends tariff and control data to the second control box C2 so that the second control box C2 can control the second switch Sw2 according to the received tariff and control data.

Preferably, the second control box C2 sends during the transfer of energy, preferably in short time intervals, interim data values of the transfer of energy, preferably comprising an amount of transferred energy, timestamps, and/or an identification of the first unit 1 to the first control box C1. The first control box C1 stores said received interim data values.

At the end of the energy transfer process, the second control box C2 sends an amount of the transferred energy measured by the second meter M2 to the first control box C1.

In particular, it is possible that the first meter M1 and the second meter M2 measure, preferably in short time intervals, energy consumption data comprising an amount of energy consumption, timestamps, and preferably an identification of the first unit 1 and second unit 2, respectively. Said energy consumption data is forwarded by the corresponding control boxes C1 and C2 to the first and second backend platform P1, P2 as further input for the consumption clearing procedure.

Preferably, the first control box C1 and the second control box C2 store data values of the transfer of energy, preferably comprising an amount of transferred energy, timestamps, and/or an identification of the first unit 1 and/or second unit 2, respectively for later checking of the consumption clearing procedure executed by the first and second backend platform P1, P2.

The control boxes C1 and/or C2 stop the transfer of energy when the request amount of transferred energy is reached and the first and/or second switch Sw1, Sw2 will be barred correspondingly. After the termination of the transfer of energy it is possible to unplug the plug of the power line 3 from the socket So1 of the first unit 1. The control boxes C1 and/or C2 obtain the corresponding instruction or information directly by the first and/or second meter M1, M2, respectively or indirectly via the first and/or second backend platform P1, P2, respectively.

In any case, energy consumption data comprising data about the amount of transferred energy measured by the first meter M1 is sent to the first backend platform P1, as well as energy consumption data comprising data about the amount of transferred energy measured by the second meter M2 is send to the second backend platform P2.

Finally, the consumption clearing procedure between the first and the second unit 1, 2 by means of the received energy consumption data is executed at the first and second platform P1, P2, preferably according to corresponding agreements. At the consumption clearing procedure, the energy transferred from the first to the second unit is at the one hand subtracted from the energy received by the first unit and counted by the first meter and at the other hand allocated to the energy consumption of the second unit. Furthermore, these corrected values of energy consumptions are used as basis for billing the energy consumption according to the specific tariff of the first and second unit, respectively. Furthermore, this data is used to execute a consumption clearing process between the energy providers of the first and second unit.

The FIGS. 4 to 7 show further preferred embodiments wherein a further platform 4 for further processing is involved, such as tax calculation. In the further embodiments as shown in the following figures, a first and a second subscriber 11, 21 assigned to the first unit 1 and the second unit 2, respectively, receive by means of the first backend platform P1 and the second backend platform P2, respectively, invoices comprising billing according to the corresponding tariffs. These invoices can further comprise a further rate, for instance a tax rate. Such a further rate is forwarded by the backend platforms P1, P2 to the further platform 4.

In the following embodiments the big unidirectional arrow indicates the direction of the energy flow between the first and second unit 1, 2, as shown in FIGS. 4 to 7.

Figure 4:
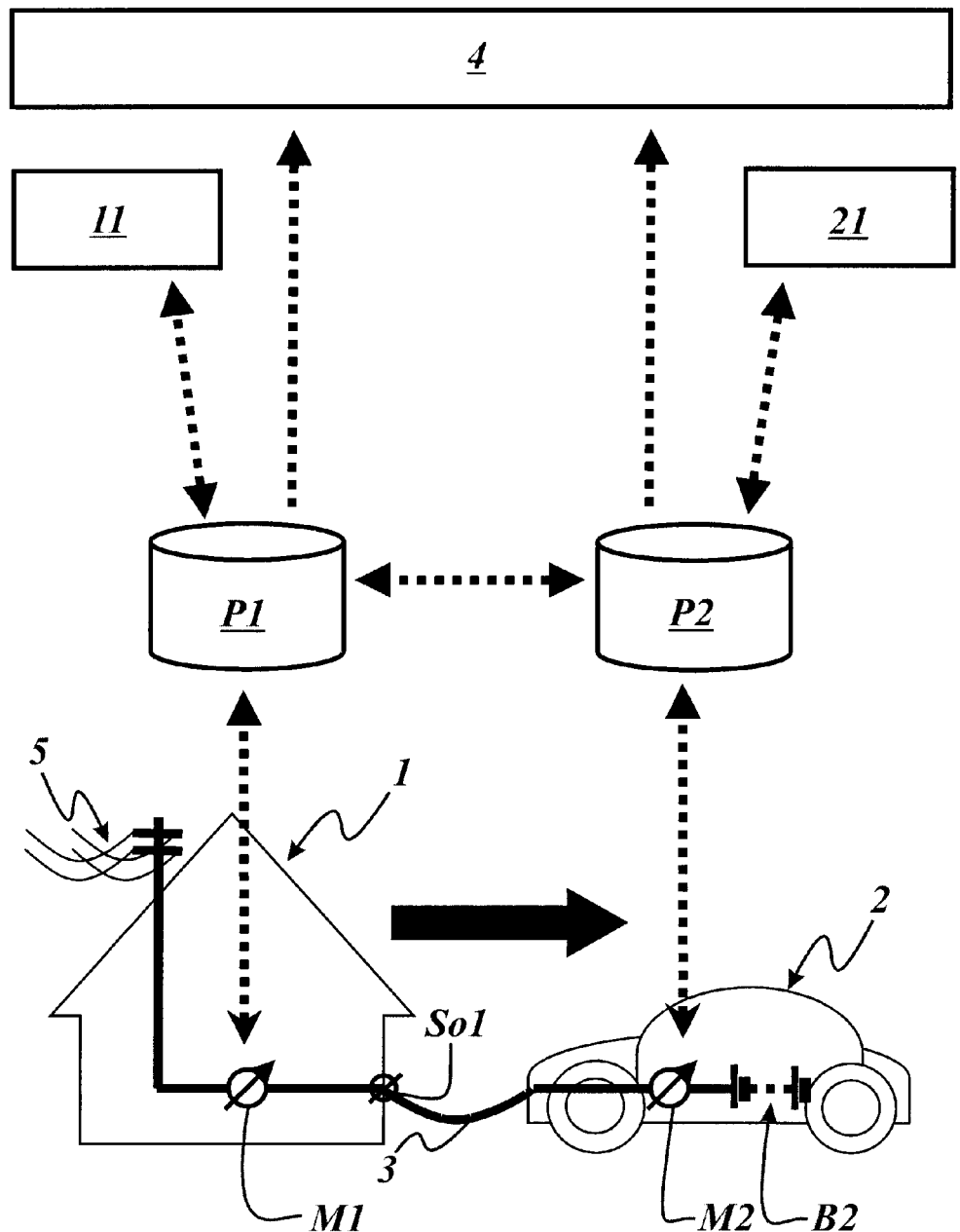
FIG. 4 shows a diagram which illustrates a case where energy provided by public utilities is transferred from a first unit to a second unit which is mobile.

By means of FIG. 4 the case is illustrated where energy provided by public utilities 5, i.e. public energy providers, is transferred from a first unit 1 to second unit 2 which is mobile.

As described before, the invention allows to differentiate energy consumption by means of cascaded meters, i.e. the meters M1, M2, for the utilities' backend platforms P1, P2. In a further step, the utilities 5 carry out a clearing of kilowatt-hours among each other according to their contracts for the exchange of energy by means of the corresponding backend platforms P1, P2.

The end consumer 11, 21 is billed according to the tariffs. The billing is carried out by each utility's billing system by means of the backend platforms P1, P2, which can consider also the taxes or other deductions.

Since the described invention allows to verify for which purpose the energy is consumed, this information can be used as basis for tax payments according to the usage of the energy. The identification of the purpose of energy consumption can be comprised within the energy transfer data available at the backend platforms P1, P2. For instance, the energy consumption tax for "The Vehicle", i.e. the second unit 2, can be charged automatically and different from the energy consumption tax in a household or a company, i.e. the first unit.

Figure 5:
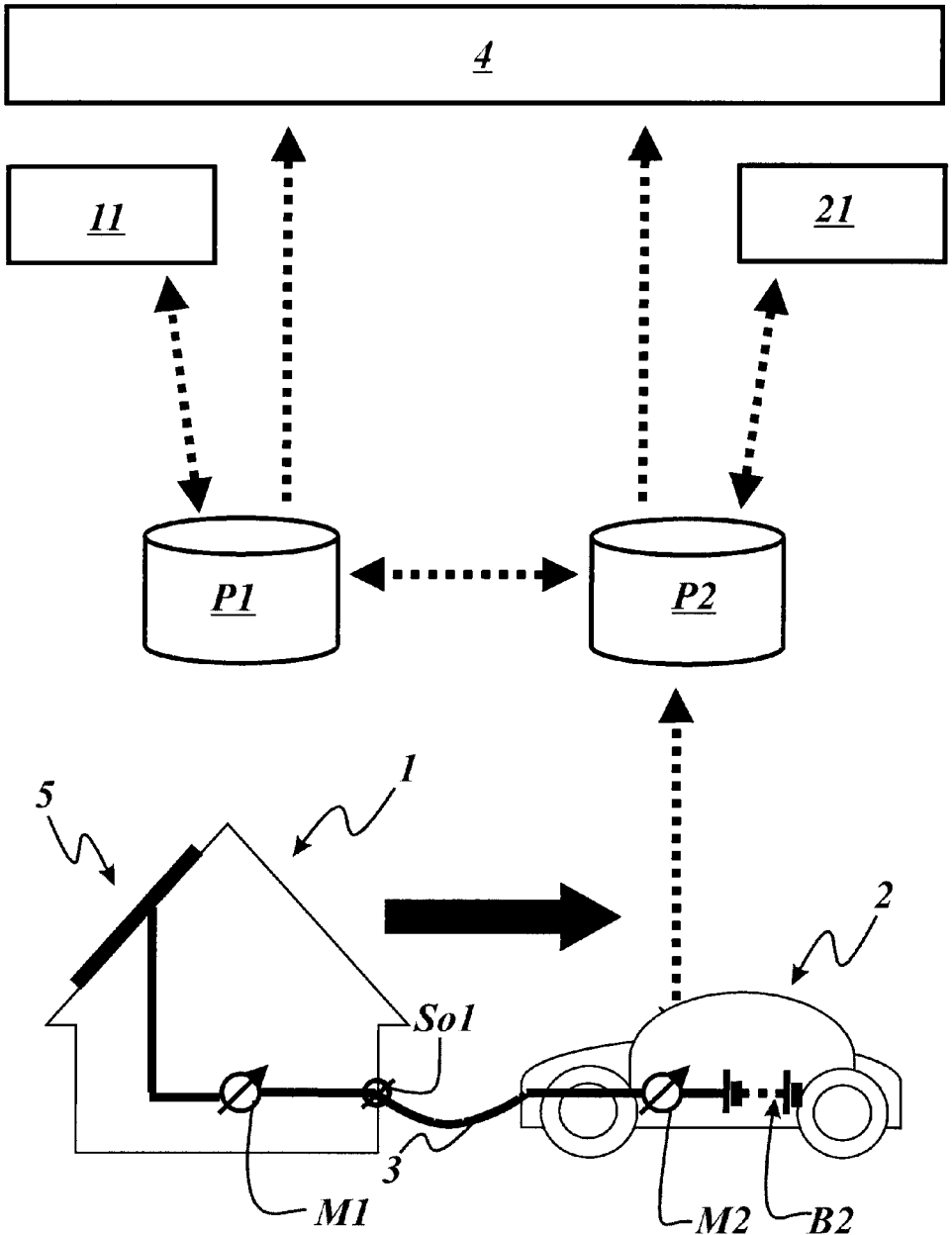
FIG. 5 shows a diagram which illustrates a case where energy is provided and transferred from a first unit to a second unit which is mobile.

By means of FIG. 5 the case is illustrated where energy is provided and transferred from a first unit 1 to second unit 2 which is mobile. The first unit 1 provides private energy generation 5, like wind, water and/or solar energy.

Besides the described solution of consuming public providers energy, the invention solves also the tax issue in case that "The Vehicle", i.e. the second unit 2, is charged from private operated generators 5, e.g. solar, wind, water etc.

In case the private energy generation utility 5 has no assigned backend platform, there will be no request for consumption clearing communicated to the second backend platform P2 of "The Vehicle", i.e. the second unit 2. However, the second platform P2 of the "The Vehicle" 2 will record the consumption of "The Vehicle" and will be able to calculate correct tax rates.

Figure 6:
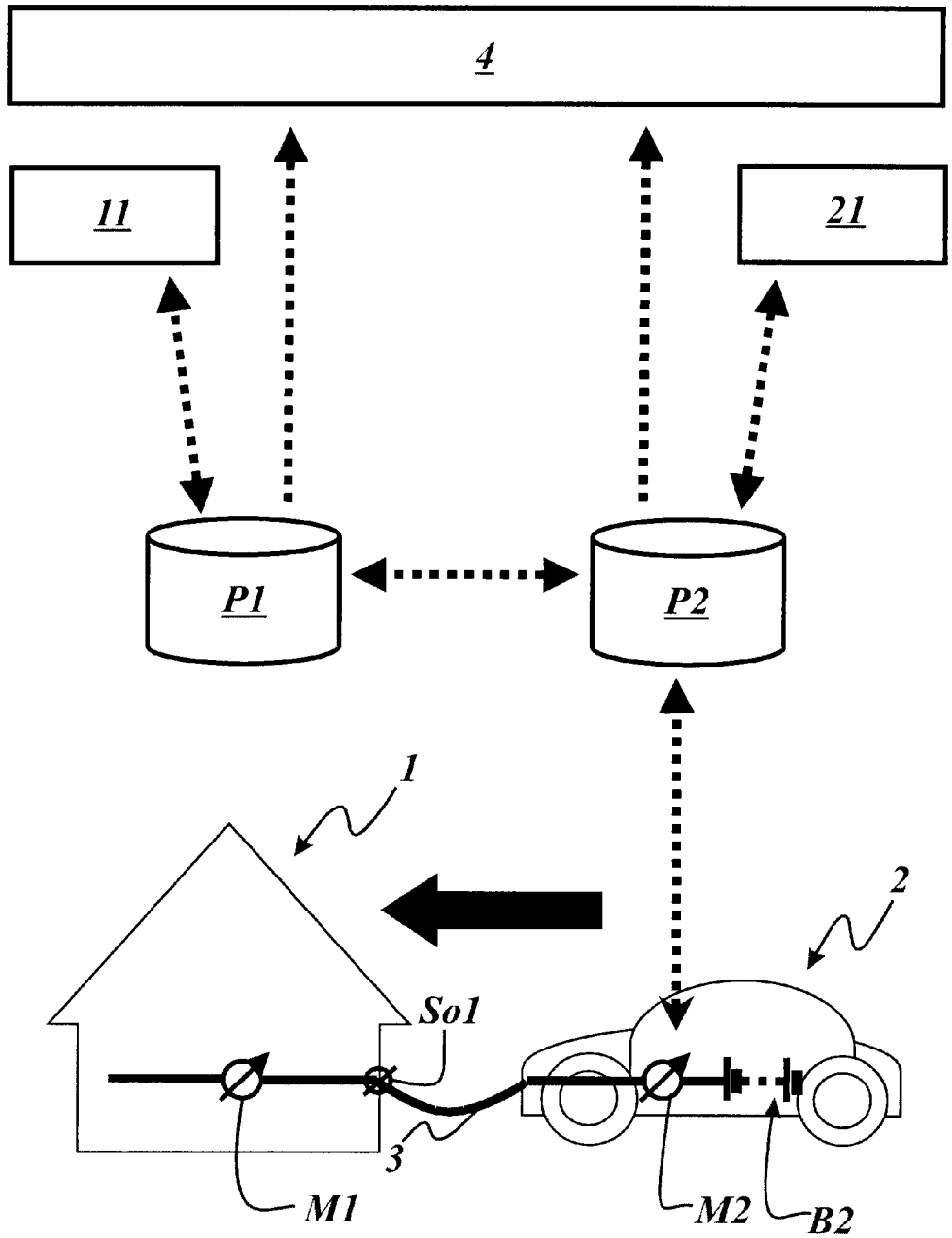
FIG. 6 shows a diagram which illustrates a case where energy provided by public utilities is transferred from a second unit to a first unit, whereby the second unit is mobile.

By means of FIG. 6 the case illustrated where energy provided by public utilities is transferred form a second unit 2 to a first unit 1, like a household, whereby the second unit 2 is mobile.

The principle of charging "The Vehicle", i.e. the second unit which is mobile, at a fixed location, e.g. from a household, i.e. the first unit 1, works also in the opposite direction. Given the case that there is an energy break or no electricity available in remote places, i.e. the first unit 1, the energy can be fed from a vehicle 2 to a house 1.

A special tariff can be defined for this case and the energy consumption tax can be raised or lowered, e.g. as household tax and not as vehicle energy consumption tax, even if the energy was transported by "The Vehicle" to the house.

Figure 7:
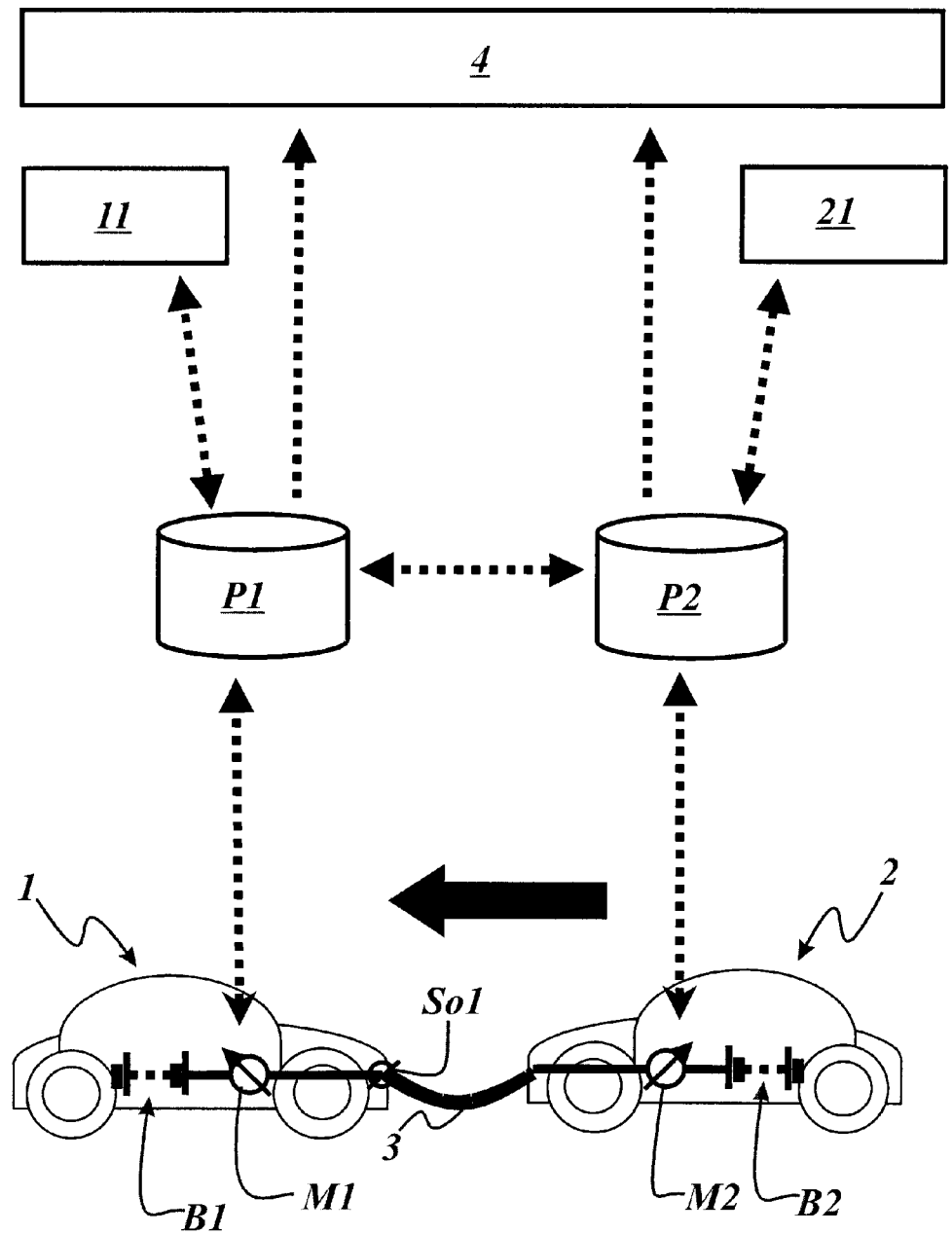
FIG. 7 shows a diagram which illustrates a case where energy provided by public utilities is transferred from a second unit to a first unit, whereby the first and the second units are mobile.

By means of FIG. 7 the case illustrated where energy provided by public utilities is transferred from a second unit 2 to a first unit 1, whereby the first and the second units 1, 2 are mobile. Therefore, FIG. 7 shows energy sharing with another mobile user.

Even if it is not the usual case, "The Vehicle", i.e. the second unit 2, can share energy with other vehicles, i.e. the first unit 1.

The users 11 and 21 of these vehicles 1 and 2, respectively, do not have to take care about cost compensation considering any individual tariffs or tax rates.

This task is carried out by the corresponding backend platforms P1 and P2, doing the clearing and tax calculation etc. Even if the two mobile parties do not know each other, the transaction appears on each party's invoice with the correct billing and tax rate.

Further preferred embodiments correspond to the preceding embodiments wherein the first and second entities are correspondingly exchanged.

The invention claimed is:

1. A method of transferring energy by a first unit in an environment further including a second unit, wherein at least one of the first and second units is mobile, wherein the first unit has a subscription to a first backend platform, said first unit comprising (i) a first meter for measuring energy exchanged with an external power source and/or an external power consumer, (ii) a first control box, (iii) a switch which allows interruption of energy exchange between the first and second units, and (iv) a transceiver operative to communicate with the first backend platform, the method comprising:

coupling a power line to the first unit, said power line being further coupled to the second unit;

receiving, by the first unit, a request for transferring energy between the first and second units, said request having originated at a second control box of the second unit;

unbarring, by the first control box, the switch in response to authentication of the first and the second units to each other;

receiving by the first control box, an indication of an amount of the transferred energy;

transmitting energy transfer data toward the first backend platform, said energy transfer data comprising data about an amount of exchanged energy measured by the first meter.

2. The method of claim 1, further comprising transferring energy between said first and second units.

3. The method of claim 2, wherein said energy is transferred via said power line.

4. The method of claim 3, wherein said energy is transferred in response to unbarring of the switch.

5. The method of claim 1, wherein the received indication of the amount of transferred energy originated at the second control box.

6. The method of claim 5, wherein the indication of the amount of transferred energy was measured at a second meter of the second unit.

7. The method of claim 1, wherein the energy transfer data is transmitted to the first backend platform.

8. An apparatus for supporting the transfer of energy between a first unit and a second unit, wherein at least one of the first and second units is mobile, and wherein the first unit has a subscription to a first backend platform, the apparatus comprising:

a transceiver operative to communicate with the first backend platform;

a connector coupleable to a power line to connect the first and second units;

a first meter operative to measure energy exchanged between the first unit and an external power source and/or an external power consumer;

a switch operatively coupled with the connector to selectively interrupt energy exchange between the first and second units; and a first control box operatively coupled with the transceiver and the switch, wherein the first control box is operative to:

receive a via the power line and/or via a public land mobile network, a request for transferring energy between the first and second units, said request having originated at a second control box of the second unit, unbar the switch upon successful execution of an authentication procedure between the first and the second units, and transmit energy consumption data toward the first backend platform, the energy consumption data comprising data about the amount of the energy transferred between the first and the second units measured by the second meter and about an amount of energy exchanged between the first unit and the external power source and/or the external power consumer measured by the first meter.

9. The apparatus of claim 8, wherein the transceiver is coupleable to a public land mobile network and/or to a public telephone switched network to communicate with the first backend platform.

10. The apparatus of claim 8, wherein the first control box is operative to support the execution of an authentication procedure between the first and the second units via the first and second backend platforms.

11. A system for facilitating energy transfer between a first unit and a second unit, wherein at least one of the first and second units is mobile, the system comprising:

a first backend platform adapted to be operative with a second backend platform subscribed to by the second unit to execute an authentication procedure between the first and second units and to perform a consumption clearing procedure with respect to energy transfer between the first and second units;

a connector coupleable to a power line to connect the first and second units;

a switch operatively coupled with the connector to selectively allow or interrupt energy exchange between the first and second units; and a first control box operatively coupled with the switch, the first control box comprising:

a receiver operative to receive a via the power line and/or via a public land mobile network, a request for transferring energy between the first and second units, and an authentication request for authentication of the second unit to the first unit, said requests having originated at a second control box of the second unit, a transceiver operative to transmit the received authentication request to the first backend platform to initiate execution of the authentication procedure, the transceiver further operative to receive authentication credentials from the first backend platform, and at least one processor configured to selectively unbar the switch to allow transfer of energy between the first and second units in response to receipt of the authentication credentials from the first backend platform;

wherein the transceiver is operative to transmit energy consumption data toward the first backend platform, the energy consumption data comprising data concerning an amount of energy exchanged between the first unit and an external power source and/or an external power consumer; and wherein the first backend platform is adapted to be operative with the second backend platform to perform the consumption clearing procedure at least partially according to the amount of energy exchanged between the first unit and the external power source and/or external power consumer and according to data about the amount of energy transferred between the first and the second units.

12. The system of claim 11, wherein the first backend platform is operative with the second backend platform to perform the consumption clearing procedure including subtracting an amount of energy transferred from the first to the second unit from the amount of energy exchanged between the first unit and the external power source and/or external power consumer, and allocating a resulting value as a basis for billing energy consumption of the second unit.

* * * * *